US010334939B2

(12) United States Patent
Nikosey (10) Patent No.: US 10,334,939 B2
(45) Date of Patent: Jul. 2, 2019

(54) APPARATUS FOR SECURING MOBILE DEVICES TO A BELT (71) Applicant: Spencer Nikosey, Los Angeles, CA (US)

(72) Inventor: Spencer Nikosey, Los Angeles, CA (US)

(*) Notice: Subject to any disclaimer, the term of this patent is extended or adjusted under 35 U.S.C. 154(b) by 252 days.

(21) Appl. No.: 15/356,435

(22) Filed: Nov. 18, 2016

(65) Prior Publication Data
US 2018/0140079 A1 May 24, 2018

(51) Int. Cl.
A45F 5/00 (2006.01)
A45F 5/02 (2006.01)
H04B 1/3827 (2015.01)

(52) U.S. Cl.
CPC ............. A45F 5/021 (2013.01); H04B 1/385 (2013.01); A45F 2005/006 (2013.01); A45F 2200/0516 (2013.01); A45F 2200/0558 (2013.01); H04B 2001/3855 (2013.01)

(58) Field of Classification Search
CPC .............. A45F 5/021; A45F 2005/006; A45F 2200/0516; A45F 2200/0558; H04B 1/385; H04B 2001/3855
USPC .......................................................... 224/677
See application file for complete search history.

(56) References Cited

U.S. PATENT DOCUMENTS

| 1,844,603 | A | * | 2/1932 | Sarson | A45F 5/021 224/238 |
| 2,819,830 | A | * | 1/1958 | Murray | A45F 5/00 224/222 |
| 3,004,315 | A | * | 10/1961 | Masure | A41D 13/04 2/51 |
| 3,305,148 | A | * | 2/1967 | Zimmerman | A45F 5/00 224/255 |
| 3,870,208 | A | * | 3/1975 | Theodore | A45C 11/00 224/250 |
| 4,029,242 | A | * | 6/1977 | Stoesser | A45F 5/00 224/222 |
| 4,408,706 | A | * | 10/1983 | Hurley | B26B 29/025 224/192 |
| 4,419,794 | A | * | 12/1983 | Horton, Jr. | A45F 5/02 224/197 |
| 4,852,784 | A | * | 8/1989 | Burton, Jr. | E05B 75/00 224/255 |
| 5,501,379 | A | * | 3/1996 | Munoz | A41F 9/002 224/240 |
| 5,664,712 | A | * | 9/1997 | Smrt | A45F 5/02 224/250 |

(Continued)

Primary Examiner — Peter N Helvey
(74) Attorney, Agent, or Firm — Cotman IP Law Group, PLC (57) ABSTRACT An apparatus for securing mobile devices to a belt are presented. The invention has a receiver coupled to a belt, e.g. utility belt. The receiver is a stud of a one-way fastener coupled to the belt with a post. A clip with a socket of the one-way fastener is removably couplable to the receiver. The clip is made of a flexible member with a grip section on one side of said socket and a lanyard section on an opposing side of the socket. The grip section is configured for a user to grip and pull to disengage the clip from the receiver. A lanyard is coupled to the clip through a hole in the lanyard section and secured with a nut. A mobile device is removably coupled to the other end of the lanyard and also secured with a similar type nut.

10 Claims, 7 Drawing Sheets (56) References Cited

U.S. PATENT DOCUMENTS

| | | | | |
|---|---|---|---|---|
| 5,827,098 A * | 10/1998 | Cunningham | ............ | B63C 9/32 |
| | | | | 441/82 |
| 5,833,095 A * | 11/1998 | Russell | .................... | A45F 5/02 |
| | | | | 224/576 |
| 6,213,365 B1 * | 4/2001 | Stocke | ............... | A41D 13/0012 |
| | | | | 224/223 |
| 6,216,931 B1 * | 4/2001 | Trawinski | ................. | A45F 3/14 |
| | | | | 224/255 |
| 6,382,481 B1 * | 5/2002 | McIlmoil | ................ | A45F 5/004 |
| | | | | 224/162 |
| 6,427,374 B1 * | 8/2002 | Vaiani | .................... | F41C 23/02 |
| | | | | 119/770 |
| 6,726,075 B1 * | 4/2004 | Patel | ........................ | A45F 3/14 |
| | | | | 224/582 |
| 6,997,362 B1 * | 2/2006 | Pidcock | .................. | A45B 1/04 |
| | | | | 135/66 |
| 8,322,586 B2 * | 12/2012 | Davis | ........................ | A45F 5/02 |
| | | | | 224/197 |
| 9,267,760 B2 * | 2/2016 | Slinkard | .............. | F41C 33/043 |

\* cited by examiner

APPARATUS FOR SECURING MOBILE DEVICES TO A BELT

BACKGROUND OF THE INVENTION

Field of the Invention

Embodiments of the invention relates to an apparatus for securing mobile devices to a utility belt.

Description of the Related Art

A utility belt is used to secure useful items to a person. Utility belts usually have pouches and attachments points for items such as keys, etc. However, these attachment points are generally not configured to provide both secured attachments and quick disconnect capabilities. It's usually one or the other.

BRIEF SUMMARY OF THE INVENTION

One or more embodiments of the invention are directed an apparatus for securing mobile devices to a belt. The invention is a locking quick-release attachment hub for mobile devices, e.g. Cell Phone, Wallet, Keys, Camera, and virtually any item that can be secured on a user. One or more embodiments of the invention uses a snap fastener that can only be disengaged by pulling in one direction, i.e. one-way snap fastener. A one-way fastener is a heavy duty, three sided locking snap fastener that can withstand extreme pressure on three sides without unlocking. However, when pulled on the fourth side the fastener will release instantly.

One or more embodiments of the invention comprises two distinct components: a receiver coupled to a belt, e.g. utility belt; and a clip (or button snap) that is couplable to a mobile device. In one or more embodiments, the receiver comprises a stud of a one-way fastener that is coupled to the front, i.e. outside facing surface, of the utility belt.

The clip comprises a flexible member and a socket of the one-way fastener coupled to the rear side of the flexible member. In one or more embodiments, the flexible member comprises a grip section, e.g. a flap, on one side of the socket and a lanyard section on the opposite side of the socket. The grip section provides the means for a user to disengage the clip from the receiver griping and pulling out, i.e. away from the belt.

In one or more embodiments, a first end of a lanyard is coupled to the clip through a hole in the lanyard section. The lanyard is preferably a paracord and a nut is used to secure the paracord to the clip. The other end of the lanyard is coupled to a mobile device, e.g. cellphone case, key fob, card, etc.

In one or more embodiments, a key ring is coupled to the clip through the hole in the lanyard section. The key ring or similar device is used to hold one or more keys, cards, fob, etc.

In one or more embodiments, the nut is generated by weaving one end of the paracord through the one or more holes in the lanyard section to create to create two sides of unequal length. The paracord is adjusted such that the second side is shorter than the first side. The first side of the paracord is then folded up at approximately 90 degree angle to the second side to begin a loop around the second side.

Next step is to wound up the first side of the paracord into one or more loops around the second side of the paracord to create a stack, in a direction from bottom to top and then weaving the first side back through the stack, pull to tighten and thereby creating the nut.

In one or more embodiments, the nut is also used to secure the mobile device to the lanyard.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION

The present invention comprising apparatus for securing mobile devices to a utility belt will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. Furthermore, although steps or processes are set forth in an exemplary order to provide an understanding of one or more systems and methods, the exemplary order is not meant to be limiting. One of ordinary skill in the art would recognize that the steps or processes may be performed in a different order, and that one or more steps or processes may be performed simultaneously or in multiple process flows without departing from the spirit or the scope of the invention. In other instances, specific features, quantities, or measurements well known to those of ordinary skill in the art have not been described in detail so as not to obscure the invention. It should be noted that although examples of the invention are set forth herein, the claims, and the full scope of any equivalents, are what define the metes and bounds of the invention.

For a better understanding of the disclosed embodiment, its operating advantages, and the specified object attained by its uses, reference should be made to the accompanying drawings and descriptive matter in which there are illustrated exemplary disclosed embodiments. The disclosed embodiments are not intended to be limited to the specific forms set forth herein. It is understood that various omissions and substitutions of equivalents are contemplated as circumstances may suggest or render expedient, but these are intended to cover the application or implementation.

The term "first", "second" and the like, herein do not denote any order, quantity or importance, but rather are used to distinguish one element from another, and the terms "a" and "an" herein do not denote a limitation of quantity, but rather denote the presence of at least one of the referenced item.

One or more embodiments of the present invention will now be described with references to FIGS. 1-8.

One or more embodiments of the present invention comprises a locking quick-release attachment hub for mobile devices, e.g. Cell Phone, Wallet, Keys, Camera, and virtually any item that can be secured to a user. The invention uses a snap fastener that can only be disengaged by pulling in one direction, i.e. one-way snap fastener.

Figure 1:
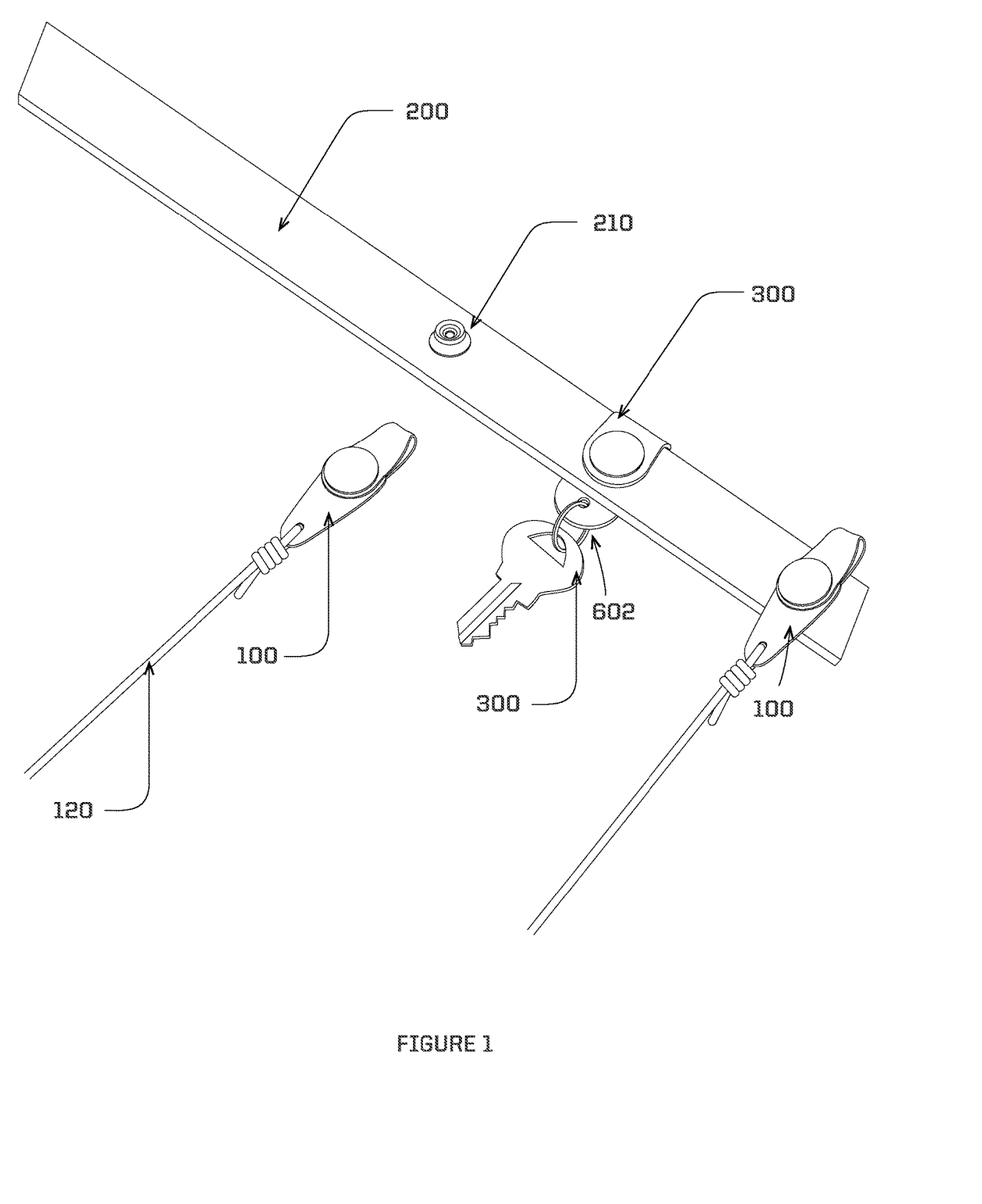
FIG. 1 is an illustration showing the various components and uses of the apparatus for securing mobile devices to a utility belt in accordance with one or more embodiments of the present invention.
Figure 2A:
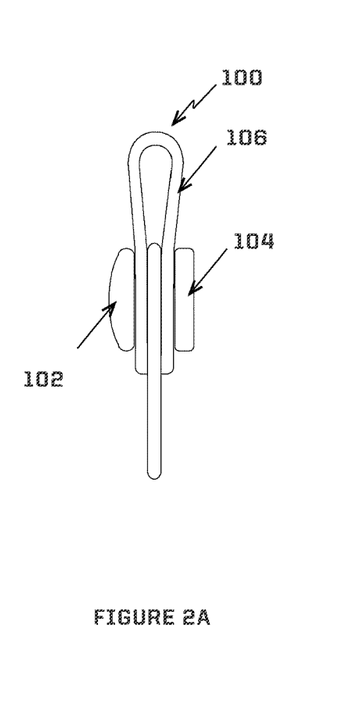
FIG. 2A is an illustration of a side view of the apparatus for securing mobile devices to a utility belt in accordance with one or more embodiments of the present invention.
Figure 2B:
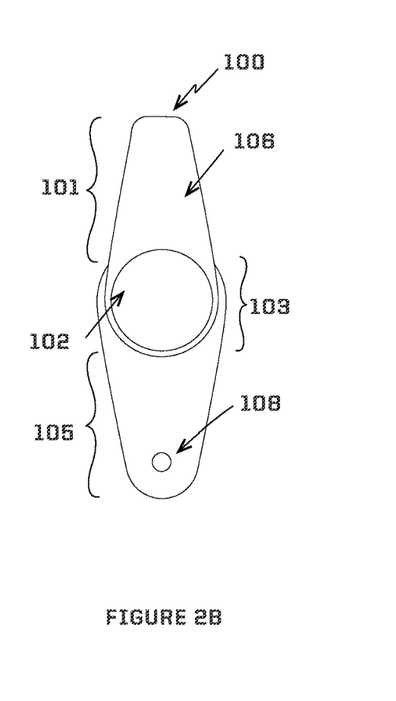
FIG. 2B is an illustration of a front view of the apparatus for securing mobile devices to a utility belt in accordance with one or more embodiments of the present invention.
Figure 2C:
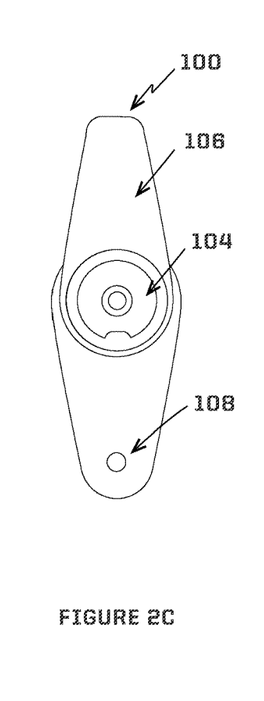
FIG. 2C is an illustration of a rear view of the apparatus for securing mobile devices to a utility belt in accordance with one or more embodiments of the present invention.
Figure 3:
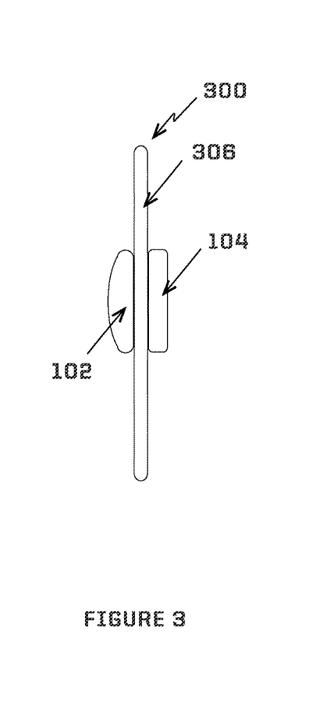
FIG. 3 is an illustration of a side view of another embodiment of the apparatus for securing mobile devices to a utility belt in accordance with the present invention.

One or more embodiments of the present invention comprises one or more receivers, e.g. 210, mounted on a utility belt 200; a clip, e.g. 100 or 300, configured to couple to a stud; and a lanyard 120 coupled to the clip. As illustrated in FIG. 1, the clip, e.g. 100, couples or snaps to receiver 210 to secure a mobile device (e.g. a wallet 400, cellphone case 500, key 600, etc.) to the utility belt 200.

One or more embodiments of the invention use a snap fastener that can only be disengaged by pulling in one direction, i.e. one-way snap fastener, such as Pull-the-DOT® fasteners, as marketed by United-Carr Fastener Corporation of Massachusetts. A one-way fastener is a heavy duty, three sided locking snap fastener that can withstand extreme pressure on three sides without unlocking. When pulled on the fourth side the fastener will release instantly.

In one or more embodiments, the receiver 210 comprises a post (FIG. 8D) and a stud (FIG. 8C) coupled to the utility belt 210. The post (not shown) is on the unexposed side of the utility belt 200, while the stud is coupled to the post on the exposed side of the utility belt through a hole in the belt.

The clip comprises a flexible member 106; cap 102; and socket 104. The flexible member comprises a mid-section 103 for coupling the cap and socket; a lanyard section 105 with a hole 108 for coupling a lanyard, e.g. 120, a key ring, e.g. 602, etc.; and a top (or grip) section 101 with adequate surface/grip area such that a user can hold and apply adequate pull force to disengage the clip from the receiver. The grip section is the side (i.e. fourth side discussed above) which when pulled, causes the fastener to instantly release. The grip section could take multiple shapes, e.g. looped as in 106, or flat as in 306, depending on the application. The cap or button 102 is coupled or riveted to the socket 104 through a hole (not shown) in the clip. The cap 102 is on the proximal side (front) while the socket is on the distal side (rear) of the clip. The cap or button 102 (FIG. 8A) rivets to the socket 104 (FIG. 8B) to create a locking snap that will only open from one side.

The flexible member is preferably made of leather material, but could also be made of synthetic, plastic or similar type materials. In one or more embodiments, the flexible member comprises a hole 108 at the lanyard section of the clip. The hole is configured to hold a lanyard 120, a ring 602, or any similar object.

Figure 7A:
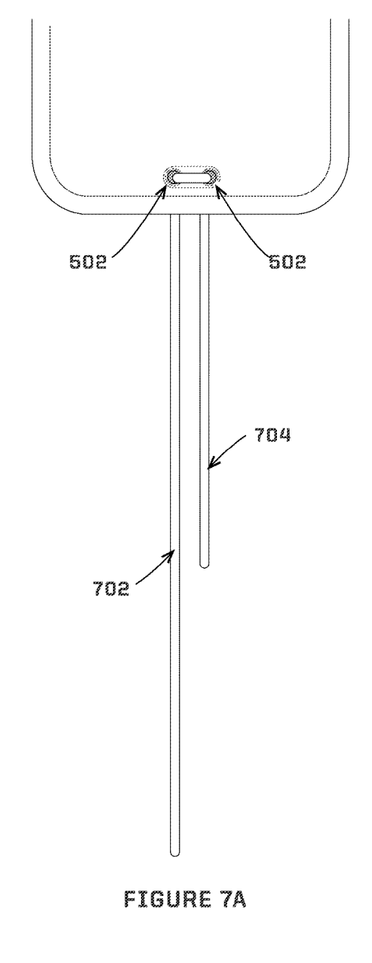
FIGS. 7A-C are illustrations of the process of attaching a lanyard to a mobile phone case in accordance with one or more embodiments of the present invention.
Figure 7B:
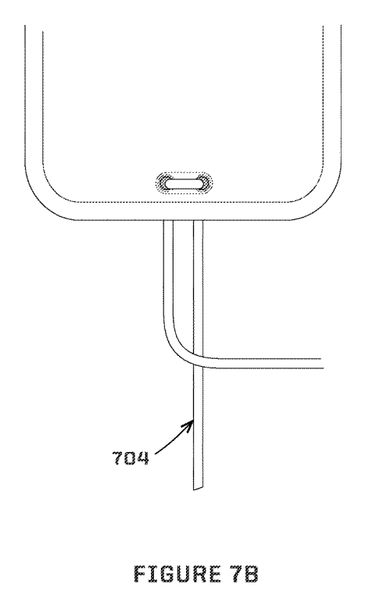
Figure 7C:
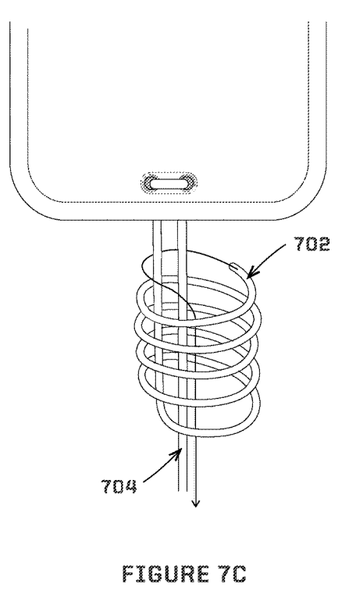
Figure 8A:
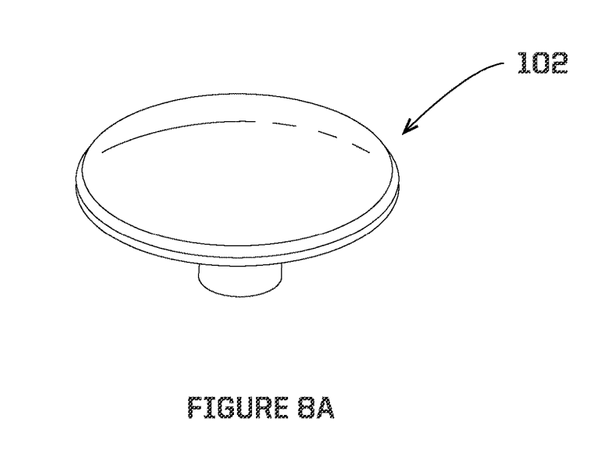
FIGS. 8A-D are illustrations of the components of a prior art one-way fastener used in one or more embodiments of the present invention (A—Cap or Button; B—Socket; C—Stud; D—Post).
Figure 8B:
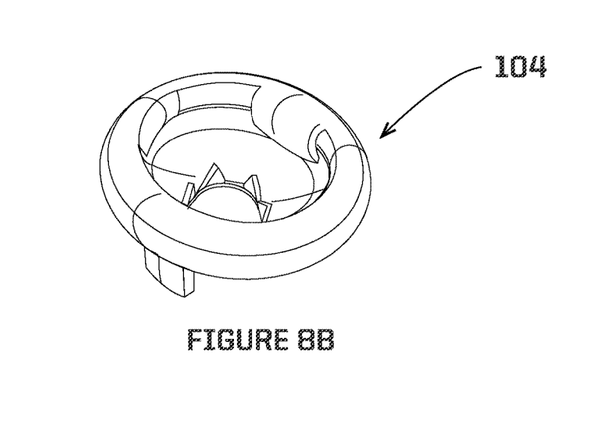
Figure 8C:
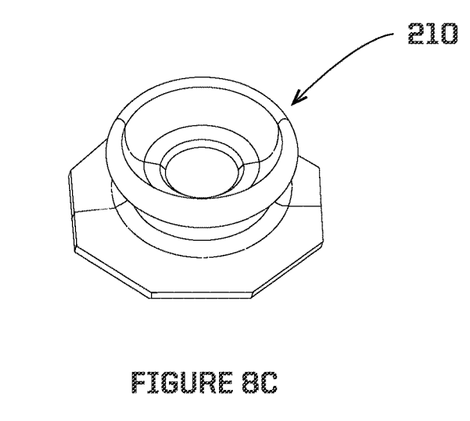
Figure 8D:
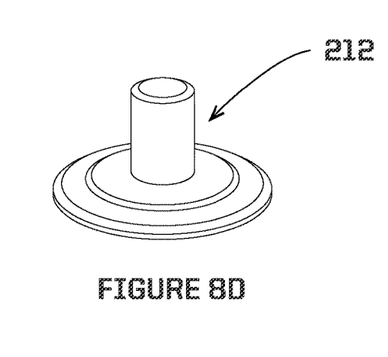

Lanyard 120 is coupled to the clip by creating a nut 122. In one or more embodiments, lanyard 120 comprises a paracord. One end of the paracord is passed or weaved through hole 108 and then wound around the body of the paracord on the other side of the hole to create nut 122. Nut 122 may be created as illustrated in FIGS. 7A to 7C. The other end of the paracord is coupled to a mobile device, e.g. a wallet 400 or a phone case 500. The mobile device may have one or more holes for coupling the lanyard. For example, a wallet may only have one hole, e.g. 402, while a cellphone case may have two holes, e.g. 502. Note that these configurations as exemplary only. Thus, a device such as a wallet may have one or more holes and a cellphone case may also have one or more holes. Those of skill in the art would appreciate that the lanyard could be made of any material that can connect the clip to the mobile object.

Figure 4:
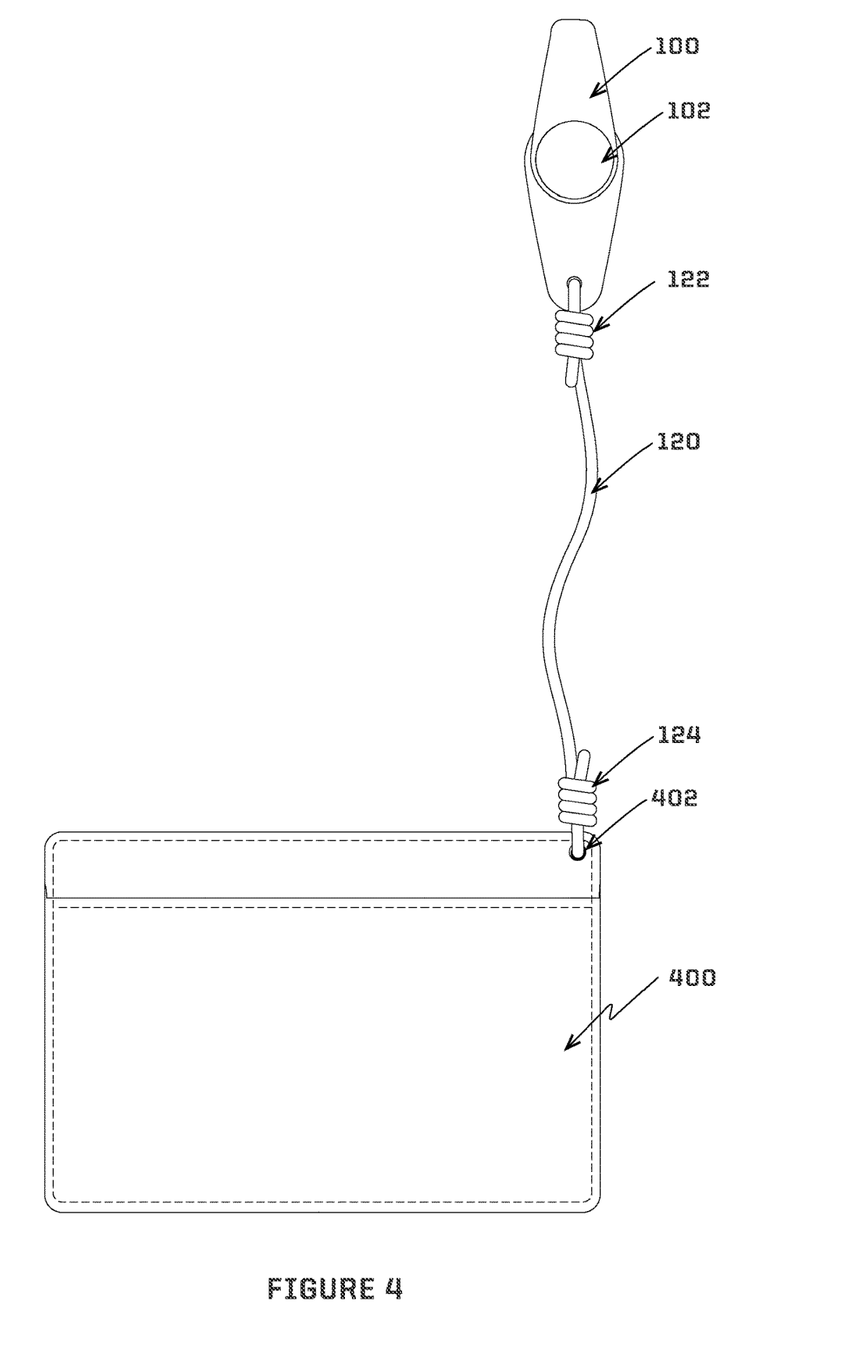
FIG. 4 is an illustration of the securing device attached to a wallet in accordance with one or more embodiments of the present invention.

FIG. 4 is an illustration of the securing device attached to a wallet in accordance with one or more embodiments of the present invention. In this configuration, the wallet 400 has a single hole 402 for coupling the lanyard. Lanyard 120 is coupled to the wallet 400 using a nut 124. The free end of the paracord is passed or weaved through hole 402 and then wound around the body of the paracord on the other side of the hole to create nut 124. Nut 124 may be created as illustrated in FIGS. 7A to 7C.

Figure 5:
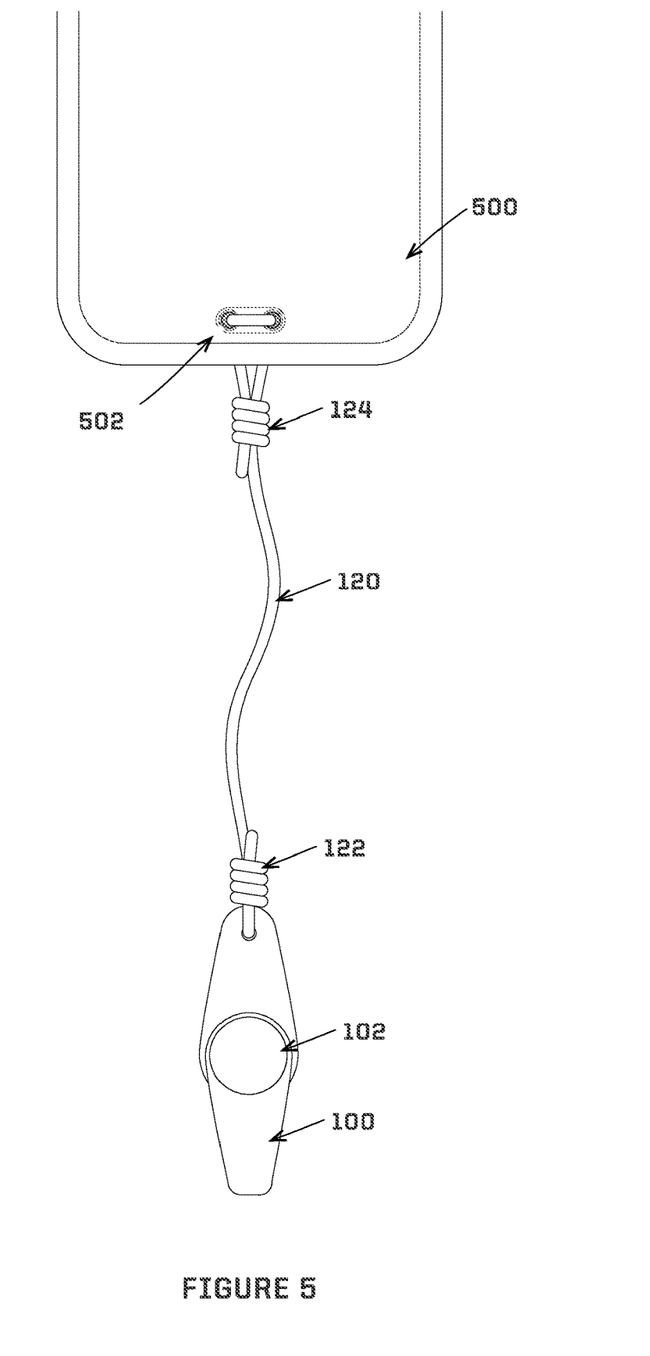
FIG. 5 is an illustration of the securing device attached to a mobile phone case in accordance with one or more embodiments of the present invention.

FIG. 5 is an illustration of the securing device attached to a mobile phone case in accordance with one or more embodiments of the present invention. In this configuration, the cellphone case 500 has two holes 502 for coupling the lanyard. Lanyard 120 may be coupled to the case using a nut 124. In one or more embodiments, the space between the two holes on the mobile phone case may be indented to flush the lanyard thereby minimizing the lanyard's interference with a snug fit between the phone case and the phone. In embodiments where the lanyard is a rope (e.g. a paracord), the free end of the paracord is weaved through holes 502, e.g. from the inside of the case in one hole and from the outside of the case in the second hole, and then wound around the body of the paracord create nut 124. Nut 124 may be created as illustrated in FIGS. 7A to 7C.

Figure 6:
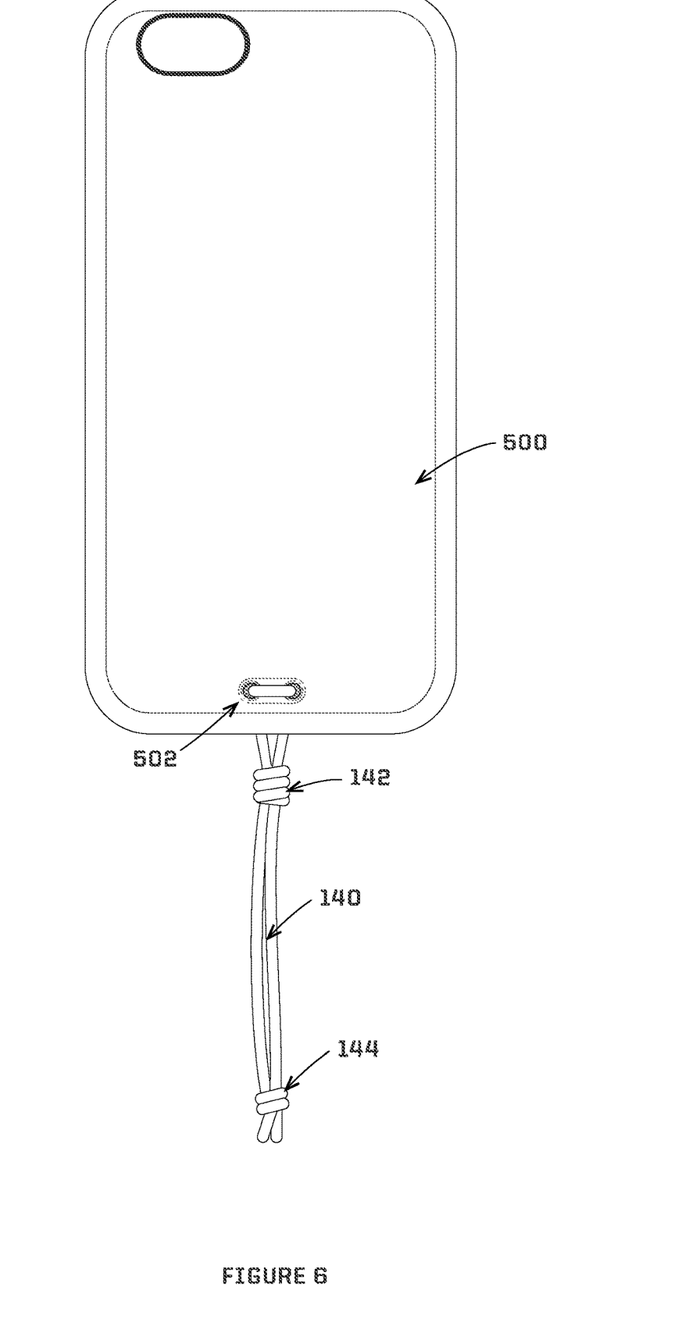
FIG. 6 is an illustration of the securing device with different attachment to a mobile phone case in accordance with one or more embodiments of the present invention.

FIG. 6 is an illustration of the securing device with different attachment to a mobile phone case in accordance with one or more embodiments of the present invention. As illustrated, lanyard 140 is coupled to cellphone case 500 such that the paracord is doubled to add strength. Nuts 142 secures the paracord to the cellphone case, while nut 144 secures the free end of the paracord to the body of the paracord.

FIGS. 7A-C are illustrations of an exemplary process of attaching a lanyard to a mobile phone case in accordance with one or more embodiments of the present invention. As illustrated, to create the nut, e.g. 122 and 124, the user begins with a paracord of desired length, e.g. 18 inches, 24 inches, etc., and weaves one end through the one or more holes (e.g. 108, 402, 502) to create two sides 702 and 704 of the paracord. Next, the use adjusts the lengths of the two sides such that one end of the paracord is shorter than the other, e.g. about 4 inches in length from the hole. For example, side 702 is longer than side 704. Note that the length of side 704 depends on approximately where the user desires the nut. This is illustrated in FIG. 7A.

The next step, as illustrated in FIG. 7B, is to take the longer side of the rope, i.e. 702, and at approximately 1.5 inches away from the case, folding it up approximately perpendicular (i.e. about a 90 degree angle) to the second side 704 to begin a loop around the second side 704.

The final step, as illustrated in FIG. 7C, comprises wounding up the longer end of the paracord, i.e. 702, into multiple or one or more loops 710 around the shorter side 704 of the paracord, in the direction from bottom to top. Once the desired stack is created, i.e. desired number of loops, the end of side 702 is weaved back through the stack as indicated by the arrow 706. To tighten the nut 122, the user pulls the end of side 704 above the stack and the end of side 702 below the stack.

While the invention herein disclosed has been described by means of specific embodiments and applications thereof, numerous modifications and variations could be made thereto by those skilled in the art without departing from the scope of the invention set forth in the claims.

What is claimed is:

1. An apparatus for securing mobile devices to a belt comprising:
    a receiver coupled to a belt, wherein the receiver comprises a stud of a one-way fastener coupled to the belt with a post;
    a clip removably couplable to the receiver, wherein the clip comprises a socket of the one-way fastener coupled to a rear side of a flexible member, wherein the flexible member comprises a grip section on one side of said socket and a lanyard section on an opposing side of the socket, wherein the grip section is configured for a user to grip and pull to disengage the clip from the receiver; and
    a lanyard with a first end coupled to said clip through a lanyard hole in said lanyard section, wherein a second end of the lanyard is coupled to a mobile device with a nut, wherein the lanyard comprises a paracord and the nut is generated by a process comprising:
        weaving one end of the paracord through one or more holes in the mobile device to create a first side of the paracord and a second side of the paracord;
        adjusting the first and second sides of the paracord such that the second side is shorter than the first side;
        taking the first side of the paracord and folding it up to be approximately perpendicular to the second side to begin a loop around the second side;
        wounding up in a bottom to top direction the first side of the paracord into one or more loops around the second side of the paracord to create a stack; and
        weaving the first side back through the stack and pulling to tighten thereby creating the nut.

2. The apparatus of claim 1, wherein the socket is coupled to said clip with a button from the front side of the flexible member.

3. An apparatus for securing mobile devices to a belt comprising:
    a receiver coupled to a belt, wherein the receiver comprises a stud of a one-way fastener coupled to the belt with a post;
    a clip removably couplable to the receiver, wherein the clip comprises a socket of the one-way fastener coupled to a rear side of a flexible member, wherein the flexible member comprises a grip section on one side of said socket and a lanyard section on an opposing side of the socket, wherein the grip section is configured for a user to grip and pull to disengage the clip from the receiver; and
    a lanyard with a first end coupled to said clip through a lanyard hole in said lanyard section, wherein a second end of the lanyard is coupled to a wallet with a nut.

4. An apparatus for securing mobile devices to a belt comprising:
    a receiver coupled to a belt, wherein the receiver comprises a stud of a one-way fastener coupled to the belt with a post;
    a clip removably couplable to the receiver, wherein the clip comprises a socket of the one-way fastener coupled to a rear side of a flexible member, wherein the flexible member comprises a grip section on one side of said socket and a lanyard section on an opposing side of the socket, wherein the grip section is configured for a user to grip and pull to disengage the clip from the receiver; and
    a lanyard with a first end coupled to said clip through a lanyard hole in said lanyard section, wherein a second end of the lanyard is coupled to a cellphone case with a nut.

5. An apparatus for securing mobile devices to a belt comprising:
    a receiver coupled to a belt, wherein the receiver comprises a stud of a one-way fastener coupled to the belt with a post;
    a clip removably couplable to the receiver, wherein the clip comprises a socket of the one-way fastener coupled to a rear side of a flexible member, wherein the flexible member comprises a grip section on one side of said socket and a lanyard section on an opposing side of the socket, wherein the grip section is configured for a user to grip and pull to disengage the clip from the receiver; and
    a lanyard with a first end coupled to said clip through a lanyard hole in said lanyard section, wherein the lanyard comprises a paracord that is secured with a nut to the clip, wherein the nut is generated by a process comprising:
        weaving one end of the paracord through the lanyard hole to create a first side of the paracord and a second side of the paracord;
        adjusting the first and second sides of the paracord such that the second side is shorter than the first side;
        taking the first side of the paracord and folding it up to be approximately perpendicular to the second side to begin a loop around the second side;
        wounding up in a bottom to top direction the first side of the paracord into one or more loops around the second side of the paracord to create a stack; and
        weaving the first side back through the stack and pulling to tighten thereby creating the nut.

6. An apparatus for securing mobile devices to a belt comprising:
    a receiver coupled to a belt, wherein the receiver comprises a stud of a one-way fastener coupled to the belt with a post; and
    a clip removably couplable to the receiver, wherein the clip comprises a socket of the one-way fastener coupled to a flexible member, wherein the flexible member comprises a grip section on one side of said socket and a lanyard section on an opposing side of the socket, wherein the grip section is configured for a user to grip and pull to disengage the clip from the receiver;
    a lanyard, wherein the lanyard comprises a paracord with a first end coupled to said clip in said lanyard section by securing the first end with a first nut, and wherein a second end of the paracord is coupled to a mobile device by securing the second with a second nut, wherein the first and second nuts are generated by a process comprising:

weaving one end of the paracord through one or more holes in the mobile device and in the lanyard section of the clip to create a first side of the paracord and a second side of the paracord;
adjusting the first and second sides of the paracord such that the second side is shorter than the first side;
taking the first side of the paracord and folding it up to be approximately perpendicular to the second side to begin a loop around the second side;
wounding up in a bottom to top direction the first side of the paracord into one or more loops around the second side of the paracord to create a stack; and
weaving the first side back through the stack and pulling to tighten thereby creating the nut.

7. The apparatus of claim 1, wherein the mobile device is a wallet.

8. The apparatus of claim 1, wherein the mobile device is a cellphone case.

9. The apparatus of claim 6, wherein the mobile device is a wallet.

10. The apparatus of claim 6, wherein the mobile device is a cellphone case.

\* \* \* \* \*